(12) United States Patent
Iwasaki

(10) Patent No.: US 8,073,827 B2
(45) Date of Patent: Dec. 6, 2011

(54) PROCESSING DEVICE AND PROCESSING METHOD

(75) Inventor: Shingo Iwasaki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 11/674,982

(22) Filed: Feb. 14, 2007

(65) Prior Publication Data

US 2007/0208754 A1    Sep. 6, 2007

(30) Foreign Application Priority Data

Mar. 3, 2006   (JP) .................................. 2006-058384

(51) Int. Cl.
  *G06F 17/00* (2006.01)
  *G06F 7/00* (2006.01)
(52) U.S. Cl. ........................................ 707/703; 707/608
(58) Field of Classification Search ........................ 707/3
    See application file for complete search history.

(56) References Cited

U.S. PATENT DOCUMENTS

| | | | |
|---|---|---|---|
| 5,717,914 A * | 2/1998 | Husick et al. ........................ 1/1 |
| 6,421,669 B1 * | 7/2002 | Gilmour et al. .............. 707/750 |
| 6,718,329 B1 * | 4/2004 | Selvin et al. .................. 707/741 |
| 6,785,708 B1 * | 8/2004 | Busey et al. .................. 709/204 |
| 6,959,308 B2 * | 10/2005 | Gramsamer et al. .......... 713/182 |
| 7,069,504 B2 * | 6/2006 | Mani et al. .................... 715/239 |
| 7,082,604 B2 * | 7/2006 | Schneiderman .............. 718/100 |
| 7,437,374 B2 * | 10/2008 | Chen et al. ............................ 1/1 |
| 2002/0103795 A1 * | 8/2002 | Kanasaki ........................ 707/3 |
| 2003/0088420 A1 * | 5/2003 | alSafadi et al. ........... 704/270.1 |
| 2003/0167445 A1 * | 9/2003 | Su et al. ........................ 715/513 |
| 2004/0111404 A1 * | 6/2004 | Mano et al. ....................... 707/3 |
| 2004/0199498 A1 * | 10/2004 | Kapur et al. ..................... 707/3 |
| 2004/0236731 A1 * | 11/2004 | Tamai et al. ..................... 707/3 |
| 2005/0086216 A1 * | 4/2005 | Davis ................................ 707/3 |
| 2005/0091607 A1 * | 4/2005 | Satou et al. .................. 715/788 |
| 2006/0004724 A1 * | 1/2006 | Tabata et al. ..................... 707/3 |
| 2006/0031750 A1 * | 2/2006 | Waldorf et al. ............ 715/501.1 |
| 2006/0041427 A1 * | 2/2006 | Yegnanarayanan et al. .. 704/235 |
| 2006/0041579 A1 * | 2/2006 | Miyashita et al. ............ 707/102 |
| 2006/0047709 A1 * | 3/2006 | Belin et al. .................... 707/201 |

FOREIGN PATENT DOCUMENTS

| | | |
|---|---|---|
| JP | 2004-205376 A | 7/2004 |
| JP | 2005-251068 A | 9/2005 |
| JP | 2005-266930 A | 9/2005 |

OTHER PUBLICATIONS

Antony Miguel; WS-BPEL 2.0 Tutorial; 2005.*

* cited by examiner

*Primary Examiner* — Apu Mofiz
*Assistant Examiner* — Jermaine Mincey

(57) ABSTRACT

A processing device inputs a first processing-descriptive document and generates a second processing-descriptive document by deleting at least one description part illustrating processing performed, so as to call the next processing device, from the first processing-descriptive document. Further, the processing device calls the next processing device by using the second processing-descriptive document.

15 Claims, 9 Drawing Sheets

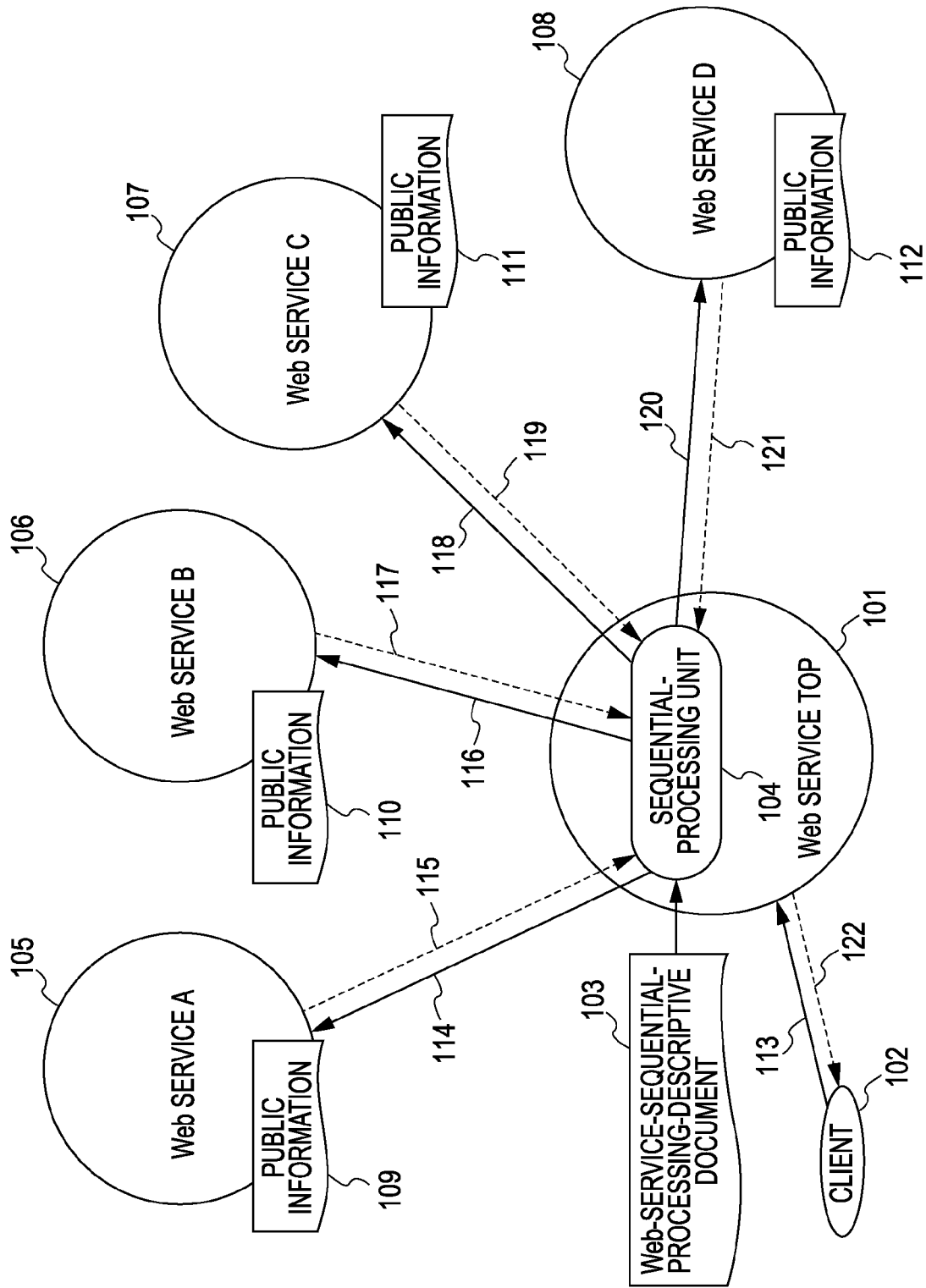

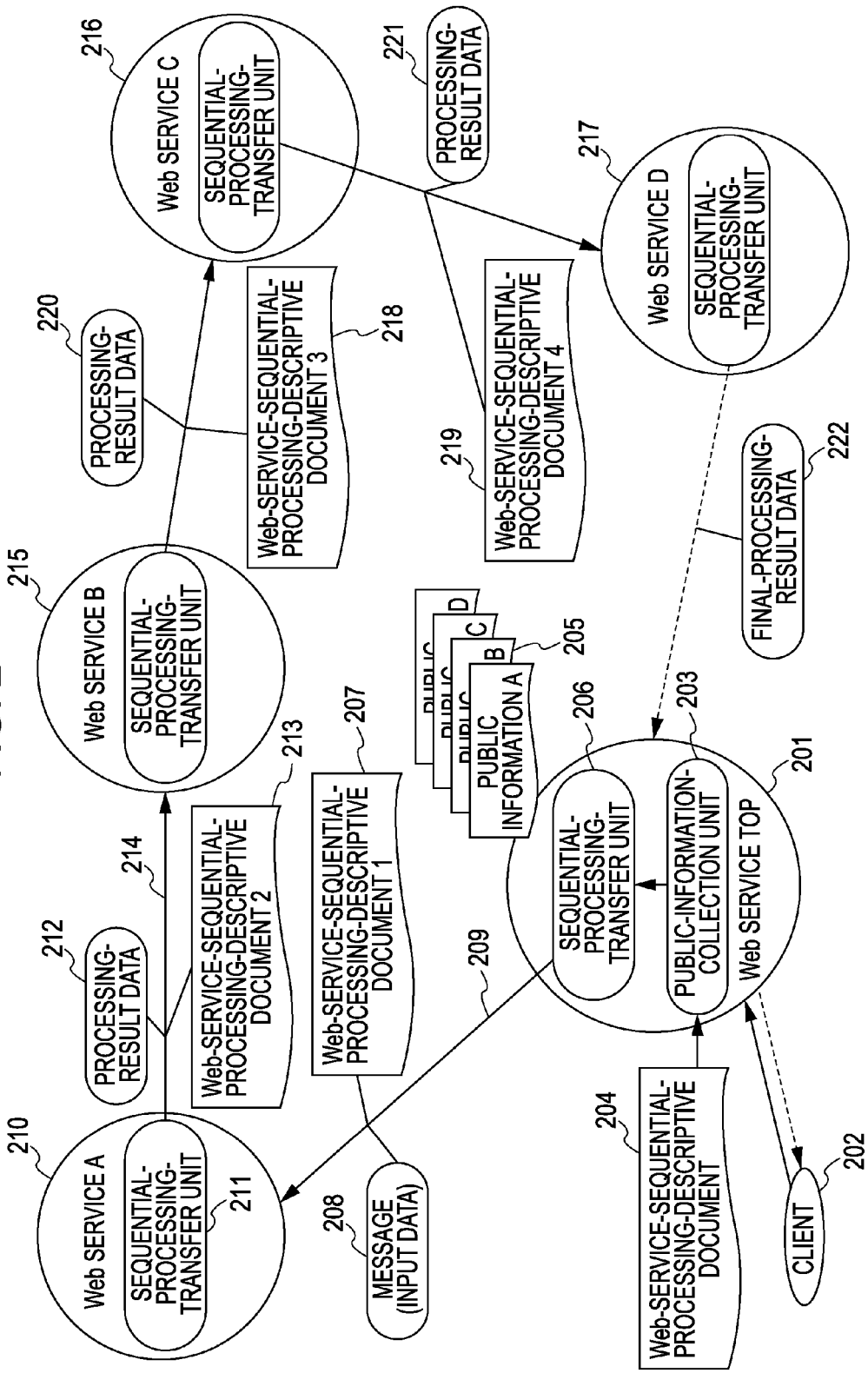

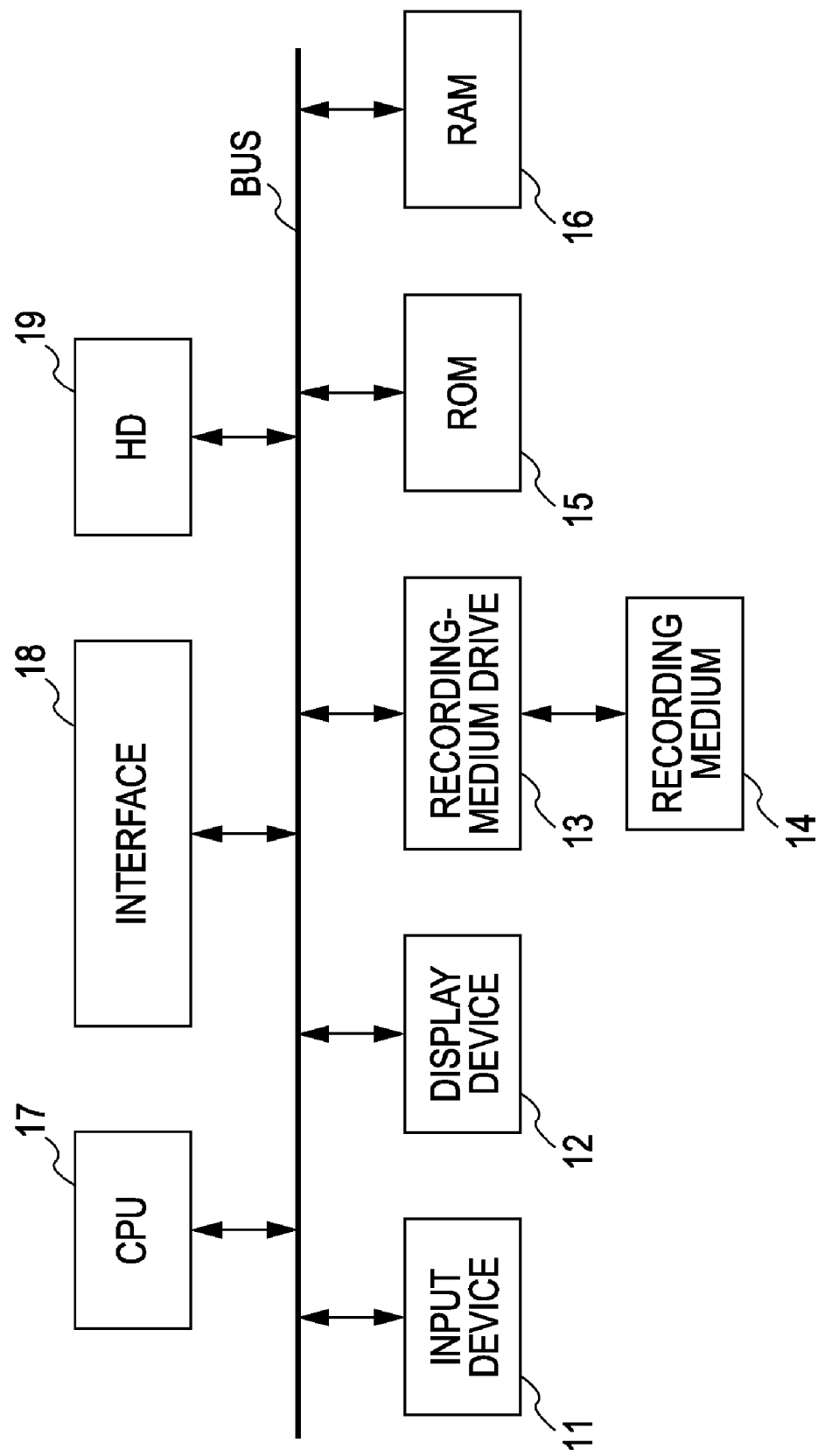

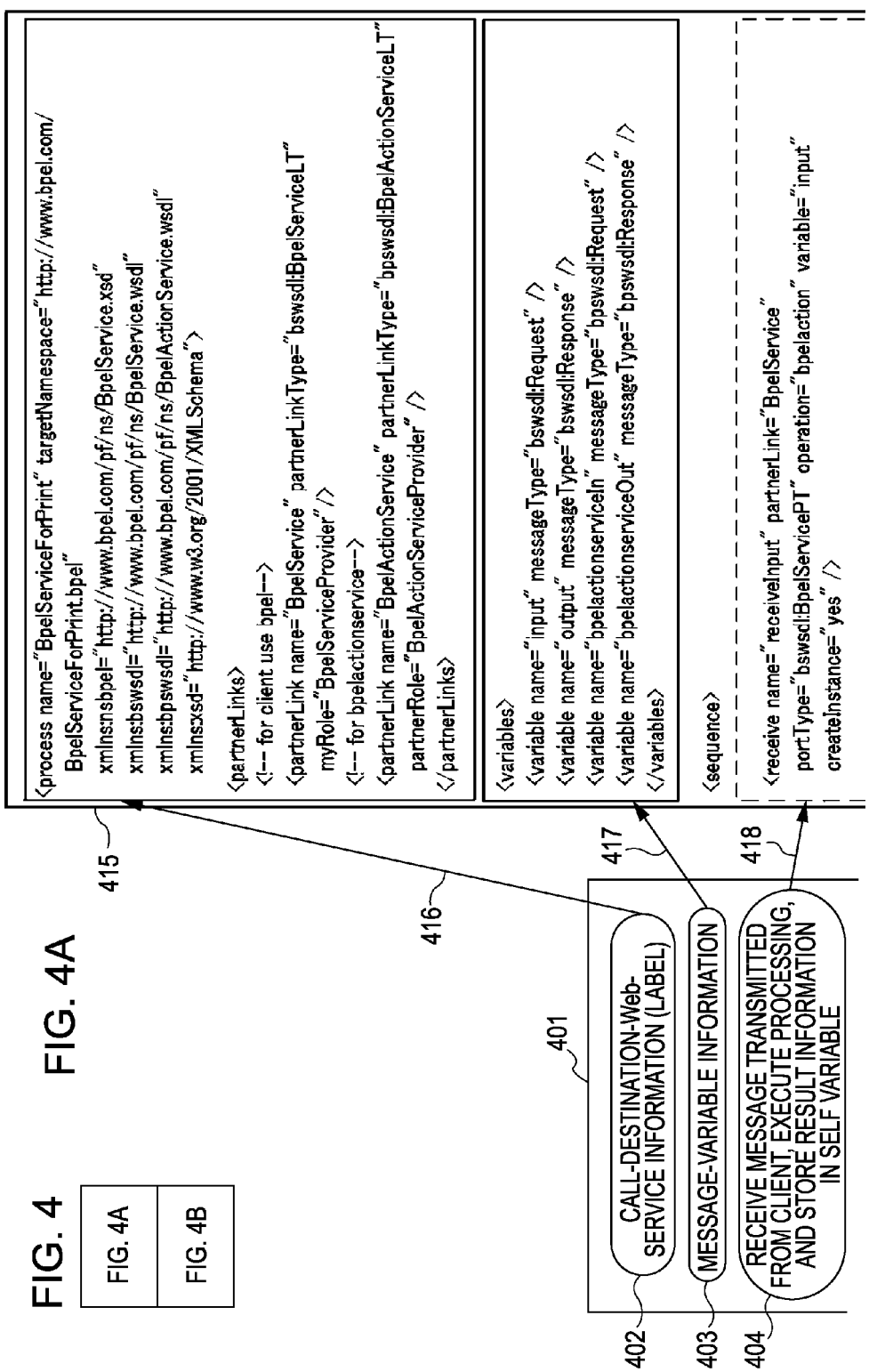

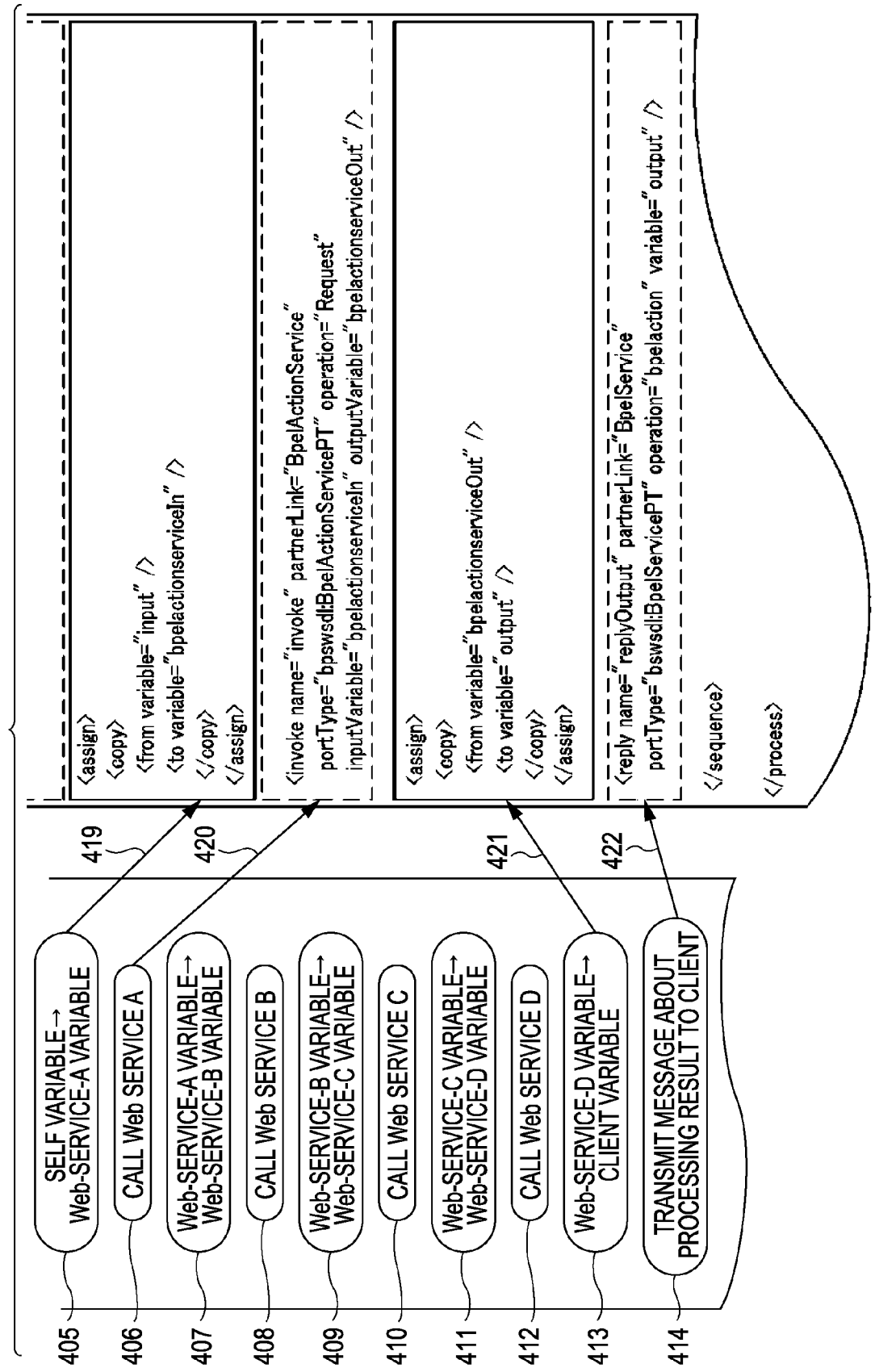

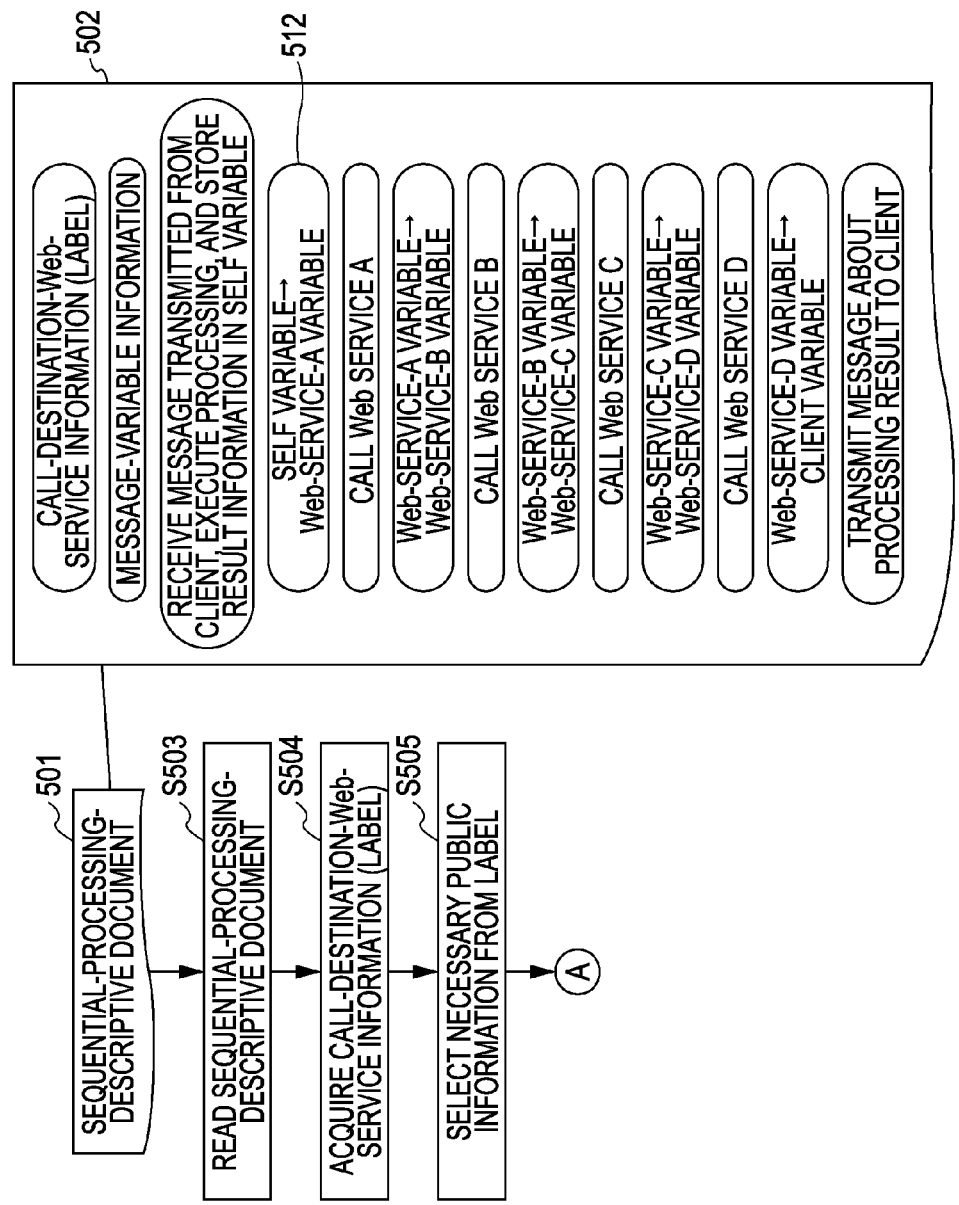

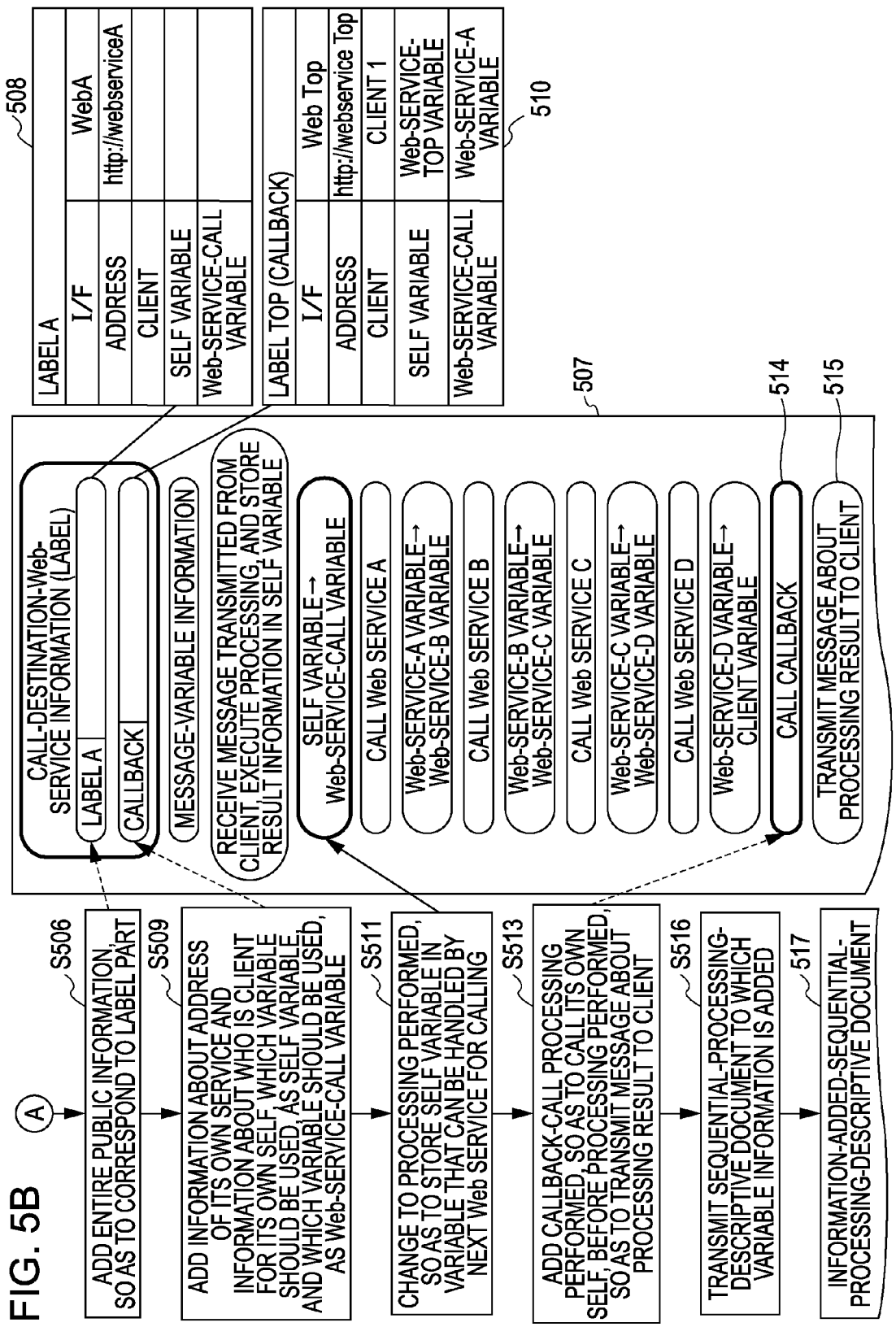

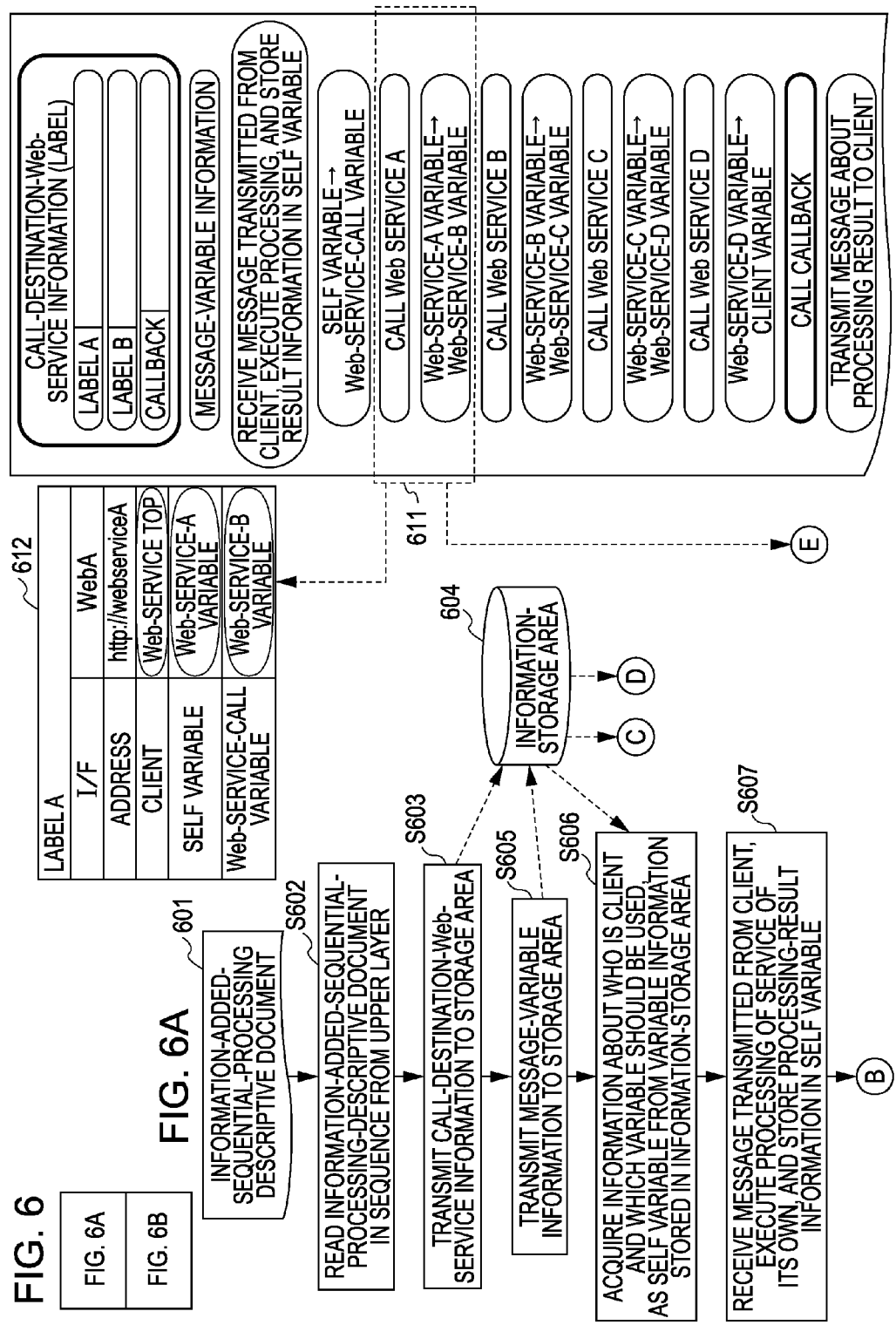

PROCESSING DEVICE AND PROCESSING METHOD

BACKGROUND OF THE INVENTION

1. Field of the Invention

The present invention relates to a processing device, a processing method and a computer readable medium used therein the processing device.

2. Description of the Related Art

In the past, when a single processing step is finished by calling a plurality of Web services and making each of the Web services perform the processing, the processing step is performed mainly by a Web service that can interpret a sequential-processing-descriptive document such as a Web-services-business-process-execution-language (WSBPEL), for example. That is to say, the Web service that can interpret the sequential-processing-descriptive document receives a request including the sequential-processing-descriptive document, the request being transmitted from a client, calls different Web services in sequence and makes each of the Web services perform processing according to the sequential-processing-descriptive document, and transmits information about a result of the processing to the client. An example technology relating to the above-described configuration is disclosed in United States Patent Application No. 20040205376.

According to known methods, however, the main Web service capable of interpreting the sequential-processing-descriptive document receives the information about the result of the processing performed by the different Web service on every occasion, transfers the received processing-result information to the next Web service for calling, and makes the next Web service perform processing. That is to say, the main Web service has to receive the processing-result information every time the called Web service performs the processing. Namely, a processing load is placed on the main Web service.

SUMMARY OF THE INVENTION

The present invention prevents processing loads from being concentrated onto a single processing device and/or a single processing service when at least two processing devices operate in cooperation with each other.

A processing device according to an embodiment of the present invention includes an input unit configured to input a first processing-descriptive document, and a processing unit configured to perform processing procedures written in the first processing-descriptive document. The processing unit generates a second processing-descriptive document by deleting at least one description part illustrating processing performed, so as to call a next processing device, from the first processing-descriptive document, and calls the next processing device by using the second processing-descriptive document.

A processing method according to an embodiment of the present invention is used for at least one processing device. The processing method includes inputting a first processing-descriptive document, and performing processing procedures written in the first processing-descriptive document. When the processing procedures are performed, a second processing-descriptive document is generated by deleting at least one description part illustrating processing performed, so as to call a next processing device, from the first processing-descriptive document, and the next processing device is called by using the second processing-descriptive document.

Moreover, a computer readable medium is provided containing computer-executable instructions for a processing. The computer readable medium includes computer-executable instructions for inputting a first processing-descriptive document; and computer-executable instructions for performing processing procedures written in the first processing-descriptive document. When the processing procedures are performed, a second processing-descriptive document is generated by deleting at least one description part illustrating processing performed, so as to call a next processing device, from the first processing-descriptive document, and the next processing device is called by using the second processing-descriptive document.

Further features of the present invention will become apparent from the following description of exemplary embodiments with reference to the attached drawings.

BRIEF DESCRIPTION OF THE DRAWINGS

FIG. 1 illustrates an example method used to call Web services in sequence and make each of the Web services perform processing, according to an aspect of the present invention.

FIG. 2 shows an overview of exemplary processing relating to sequential-processing-transfer units or the like provided, so as to transfer the processing performed by a Web service, according to an aspect of the present invention.

FIG. 3 is a hardware-configuration diagram showing an example hardware configuration of an information-processing device, according to an aspect of the present invention.

FIGS. 4A-B show an example sequential-processing-descriptive document, according to an aspect of the present invention.

FIGS. 5A-B show the flow of example processing procedures performed by a public-information-collection unit, according to an aspect of the present invention.

FIGS. 6A-B show the flow of example processing procedures performed by a sequential-processing-transfer unit, according to an aspect of the present invention.

DESCRIPTION OF THE EMBODIMENTS

Figure 6B:
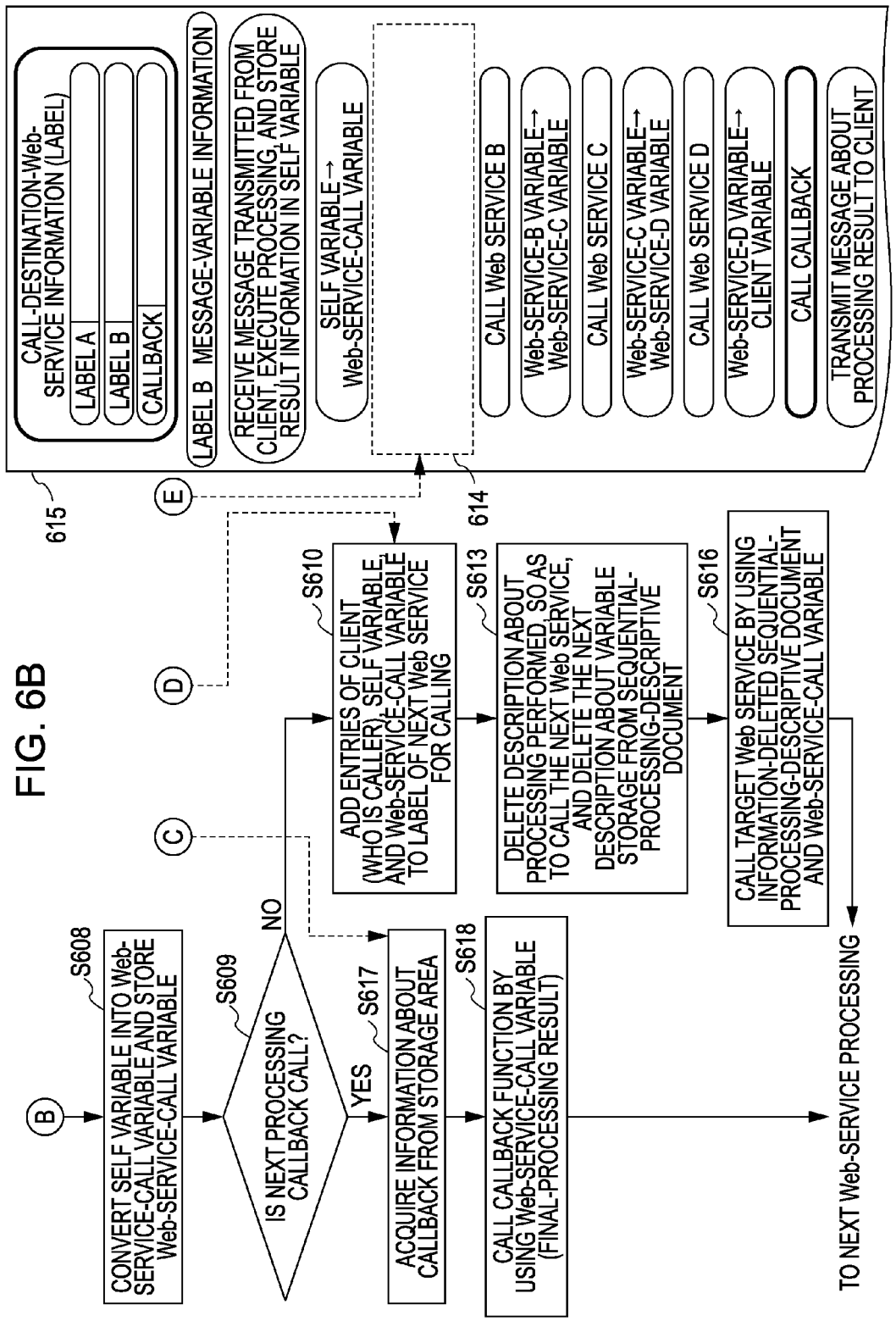

Hereinafter, embodiments of the present invention will be described with reference to the attached drawings.

FIG. 1 shows an exemplary method used to call Web services in sequence and make each of the Web services perform processing. A Web-service TOP 101 is provided, as a Web service playing a main roll in performing sequential processing. Upon receiving a sequential-processing instruction 113 transmitted from a client 102, the Web-service TOP 101 reads a Web-service-sequential-processing-descriptive document 103. Then, the Web-service TOP 101 calls different Web services A, B, C, and D that are designated by reference numerals 105, 106, 107, and 108 according to the details of the Web-service-sequential-processing-descriptive document 103 by using a sequential-processing unit 104 so that each of the Web services 105 to 108 executes processing.

The Web service 105 has public information 109, the Web service 106 has public information 110, the Web service 107 has public information 111, and the Web service 108 has public information 112, where every public information shows the address of the Web service corresponding to the public information and an interface provided, so as to call the Web service. Then, the Web-service TOP 101 reads the above-described public information designated by reference numerals 109 to 112 and stores information about the Web service for calling.

The client 102 transmits a request (a message including the request) 113, so as to perform the processing corresponding to details of the Web-service-sequential-processing-descriptive document 103, and the Web-service TOP 101 receives the request. Then, the Web-service TOP 101 reads the Web-service-sequential-processing-descriptive document 103 and interprets the details thereof in sequence from the upper layer. First, the Web-service TOP 101 transmits the request message 113 transmitted from the client 102 to the Web-service-A 105, as indicated by an arrow 114. Then, the Web-service-A 105 performs processing and processing-result information 115 showing a result of the processing performed by the Web-service-A 105 is transmitted to the Web-service TOP 101.

Likewise, the Web-service TOP 101 calls the Web-service-B 106, the Web-service-C 107, and the Web-service-D 108 in sequence, as indicated by arrows 116, 118, and 120. Then, each of the Web services performs processing, and pieces of processing-result information 117, processing-result information 119, and processing-result information 121 that show results of the processing are transmitted to the Web-service TOP 101.

The Web-service TOP 101 transmits processing-result information 122 showing the results of the processing performed by the Web services, for example, to the client 102. Subsequently, the processing performed for the request made by the client 102 is finished.

FIG. 2 shows an overview of example processing relating to sequential-processing-transfer units or the like provided, so as to transfer the processing performed by a Web service. A Web service TOP (201) receives a request (a message) made by a client 202. The Web service TOP (201) includes a public-information-collection unit 203 and a sequential-processing-transfer unit 206, as functions. Upon receiving the request message transmitted from the client 202, the Web service TOP (201) reads a Web-service-sequential-processing-descriptive document 204 through a public-information-collection unit 203.

When the Web-service-sequential-processing-descriptive document 204 includes a description about reading a different Web service, the public-information-collection unit 203 reads public information 205 about the different Web service. The public information 205 corresponds to each of the public information 109, the public information 110, the public information 111, and the public information 112 that are shown in FIG. 1. Here, the Web service TOP (201) stores the public information 109, the public information 110, the public information 111, and the public information 112, as public information 205, in advance. Then, the public-information-collection unit 203 adds the public information 205 about the read different Web service, callback information indicating that a callback destination is the Web service TOP (201), and so forth to the Web-service-sequential-processing-descriptive document 204. After that, the public-information-collection unit 203 transfers the Web-service-sequential-processing-descriptive document 204 to the sequential-processing-transfer unit 206.

The Web-service-sequential-processing-descriptive document 204 further includes the same information as that of the Web-service-sequential-processing-descriptive document 103 shown in FIG. 1. The above-described information indicates that the Web services are called in sequence and made to finish the processing.

First, the sequential-processing-transfer unit 206 reads the details of the Web-service-sequential-processing-descriptive document 204 in sequence. When the sequential-processing-transfer unit 206 reads a description about the first Web service for calling (a Web-service-A 210 in FIG. 2), the sequential-processing-transfer unit 206 deletes the description and information or the like relating to the description. Then, the sequential-processing-transfer unit 206 adds information about who transmitted the above-described request message, what variable is transmitted, as the above-described request message, and so forth to the Web-service-sequential-processing-descriptive document 204. Thus, the sequential-processing-transfer unit 206 adds and/or deletes the above-described information to and/or from the Web-service-sequential-processing-descriptive document 204, whereby a Web-service-sequential-processing-descriptive document 1 designated by reference numeral 207 is generated.

The sequential-processing-transfer unit 206 calls the first Web service, that is, a Web-service-A 210, as indicated by an arrow 209, by using information including the generated Web-service-sequential-processing-descriptive document 1 (207) and a message (input data) 208 transmitted from the client 202 that are added to each other. The called Web service A 210 includes a sequential-processing-transfer unit 211, as one of its functions, and reads the message 208 and the Web-service-sequential-processing-descriptive document 1 (207) through the sequential-processing-transfer unit 211, so as to perform the processing of the Web service A (210).

The sequential-processing-transfer unit 211 performs its own processing. Further, when the sequential-processing-transfer unit 211 reads a description about the next Web service for calling (a Web service B (215) in FIG. 2) from the Web-service-sequential-processing-descriptive document 1 (207), the sequential-processing-transfer unit 211 deletes the description and information or the like relating to the description. Further, the sequential-processing-transfer unit 211 adds information about who transmitted the above-described request message, what variable is transmitted, as the above-described request message, and so forth to the Web-service-sequential-processing-descriptive document 1 (207). Thus, the sequential-processing-transfer unit 211 adds and/or deletes the above-described information to and/or from the Web-service-sequential-processing-descriptive document 1 (207), whereby a Web-service-sequential-processing-descriptive document 2 designated by reference numeral 213 is generated.

The sequential-processing-transfer unit 211 calls the next Web service, that is, a Web service B designated by reference numeral 215 by using information including the generated Web-service-sequential-processing-descriptive document 2 (213) and processing-result data 212 indicating a result of the processing performed by the sequential-processing-transfer unit 211 that are added to each other, as indicated by an arrow 214.

A sequential-processing-descriptive document 218 is transferred from the Web service B (215) to the Web service C (216) and a sequential-processing-descriptive document 219 is transferred from the Web service C (216) to the Web service D (217) in the above-described manner. Subsequently, the Web service B (215) calls the Web service C (216), and the Web service C (216) calls the Web service D (217). Then, processing-result data 220 is transferred from the Web service B (215) to the Web service C (216), and processing-result data 221 is transferred from the Web service C (216) to the Web service D (217).

Here, a Web-service-sequential-processing-descriptive document 4 designated by reference numeral 219 does not include a description about calling the next Web service. However, the Web-service-sequential-processing-descriptive document 4 (219) includes callback information. Therefore, a sequential-processing-transfer unit of the Web service D (217) transmits information about a result of processing performed by the sequential-processing-transfer unit to the Web service TOP (201) which is the callback destination, as final-processing-result data 222.

Upon receiving the final-processing-result data 222, the Web service TOP (201) transmits a message including the final-processing-result data 222 to the client 202, whereby the above-described series of processing procedures is finished.

Thus, at least one predetermined description is deleted and/or added from and/or to the sequential-processing-descriptive document, for example, and the sequential-processing-descriptive document is transferred among the above-described Web services so that the processing transfer is achieved. Therefore, it becomes possible to prevent processing and/or data from being concentrated onto the Web service TOP (201).

Hereinafter, an example hardware configuration of an information-processing device will be described with reference to FIG. 3, where the Web service TOP (201), the Web service A (210), the Web service B (215), the Web service C (216), and the Web service D (217) are mounted on the information-processing device. According to the above-described hardware configuration, the information-processing device includes an input device 11, a display device 12, a recording-medium drive 13, a read-only memory (ROM) 15, a random-access memory (RAM) 16, a central-processing unit (CPU) 17, an interface 18, and a hard disk (HD) 19, as shown in FIG. 3.

The input device 11 includes a keyboard, a mouse, and so forth operated by an operator of the information-processing device. The input device 11 is used, so as to input various types of operation information or the like to the information-processing device. The display device 12 includes a display or the like used by the operator of the information-processing device. The display device 12 is used, so as to show various types of information (or screen images), for example. The interface 18 is provided, so as to connect the information-processing device to a network or the like.

A program relating to a flowchart or the like that will be described later is supplied to the information-processing device through the recording medium 14 including a compact disk (CD)-ROM or the like and/or downloaded to the information-processing device via a network or the like. The recording medium 14 is inserted into the recording-medium drive 13 and the program is transmitted from the recording medium 14 and installed onto the HD 19 via the recording-medium drive 13.

The ROM 15 stores a program or the like which will be read first when the power of the information-processing device is turned on. The RAM 16 is a main memory of the information-processing device. The CPU 17 reads the program from the HD 19, stores the read program into the RAM 16, and executes the program. Subsequently, the functions of the Web services and/or the sequential-processing-transfer units 206 and 211 (and the public-information collection unit 203) are provided. Further, processing procedures shown in flowcharts that will be described later, for example, are performed. Further, the HD 19 stores public information and/or processing-result data or the like other than the program.

In the information-processing device on which the Web service TOP (201) is mounted, a program provided, so as to function, as the public-information-collection unit 203 and the sequential-processing-transfer unit 206, the Web-service-sequential-processing-descriptive document 204, and the public information 205 are stored onto the HD 19. Further, in an information-processing device on which the Web service A (210), the Web service B (215), the Web service C (216), and the Web service D (217) are mounted, a program provided, so as to function, as the sequential-processing-transfer unit 211, the public information 109, the public information 110, the public-information 111, and the public information 112 are stored onto the HD 10.

An example of the public information 205 will now herein be described. The public information 205 includes a label, a part where the address of the Web service TOP (201) is written, and a part where interface (I/F) information provided, so as to start the service of the Web service TOP (201), is written. The above-described label is provided, as an identifier (unique information) that is used, so as to determine which public information should be used by the sequential-processing-transfer unit. The address of the service of the Web service TOP (201) is shown, as a uniform-resource locator (URL) or the like, for example. Each of the above-described Web services receives data on an input message and the sequential-processing-descriptive document via the service-start I/F of its own, and performs processing.

FIG. 4 shows an example sequential-processing-descriptive document. A diagram 401 shows the configuration of an example Web-service-sequential-processing-descriptive document. Reference numeral 402 indicates a call-destination-Web-service information (a label) linked to the label of the public information 205. Reference numeral 403 indicates message-variable information including the description of a declaration of the variable corresponding to each of the Web services (type information). Reference numeral 404 indicates the description of processing procedures performed, so as to receive a message transmitted from a client, perform processing, and storing information about a result of the processing in a self variable. Here, the term self variable denotes a variable that can be handled by each of the Web services.

Reference numeral 405 denotes a part showing a description about processing procedures performed, so as to convert the self variable into a variable that can be handled by the next Web service for calling and store the converted variable. Reference numeral 406 denotes a part showing a description about processing performed, so as to call the next Web service. Reference numerals 407, 408, 409, 410, 411, 412, and 413 also denote parts showing descriptions about processing procedures performed, so as to store variables and call Web services in sequence. Reference numeral 414 denotes a part showing a description about response processing performed, so as to transmit a processing-result message to the client.

Reference numeral 415 denotes a part showing a description about an example specific sequential-processing-descriptive document generated according to the above-described configuration. Comparing the part 401 with the part 415, a part designated by reference numeral 416 describes the call-destination-Web-service information, as name space and/or <partnerLinks>-tags. A part designated by reference numeral 417 describes the message-variable information, as <variables>-tags. A part designated by reference numeral 418 describes details of processing performed, so as to receive the message transmitted from the client, as a <receive>-tag.

A part designated by reference numeral 419 describes the variable-storage processing by using an <assign>-tag and/or <copy>-tags. A part designated by reference numeral 420 describes the Web-service-call processing by using an <invoke>-tag. A part designated by reference numeral 421 describes processing performed, so as to convert information about a result of the Web-service-call processing into a variable that can be interpreted by the client and store the converted variable, by using the <assign>-tags and the <copy>-tags. A part designated by reference numeral 422 describes processing performed, so as to transmit the message including the processing-result information to the client, by using a <reply>-tag.

The flow of processing procedures performed, so as to call the Web services in sequence and make each of the Web services perform the processing, can be provided, as an extensible-markup-language (XML) text, for example. The sequential-processing-transfer unit or the like parses the XML text from the upper part thereof and interprets the details on the XML text so that the Web services are called and performed in sequence. A WSBPEL document designated by reference numeral 415 is provided, as an example sequential-processing-descriptive document. Hereinafter, in this embodiment, details on the above-described processing will be described by using the configuration diagram 401.

FIG. 5 shows the flow of example processing procedures performed by the public-information-collection unit 203. Reference numeral 501 denotes a Web-service-sequential-processing-descriptive document. Reference numeral 502 shows the specific configuration of an example of the Web-service-sequential-processing-descriptive document 501. An example of the Web-service-sequential-processing-descriptive document 502 corresponds to the WSBPEL text 415 shown in FIG. 4.

At step S503, the public-information-collection unit 203 reads the Web-service-sequential-processing-descriptive document 501. At step S504, the public-information-collection unit 203 acquires the call-destination-Web-service information (label) 402 written in the Web-service-sequential-processing-descriptive document 501. At step S505, the public-information-collection unit 203 selects the public information 205 supplied from the call-destination-Web service by using the acquired label, as key information.

At step S506, the public-information-collection unit 203 draws necessary information from the selected public information 205. Then, the public-information-collection unit 203 adds information about the I/F and/or address of the call-destination-Web service to the selected public information 205, the information being included in public information 508 selected, at step S505, so that the added information corresponds to the details of the label part of the Web-service-sequential-processing-descriptive document 501, as shown in a part designated by reference numeral 507.

The public-information-collection unit 203 is mounted on a Web service (the Web service TOP (201) in the above-described embodiment) provided, so as to start the sequential processing. The Web service TOP (201) is recommended to receive information about a final result of the processing performed by each of the Web services. Subsequently, at step S509, the public-information-collection unit 203 stores the callback information 510 in the Web-service-sequential-processing-descriptive document 501. That is to say, the public-information-collection unit 203 adds information about the address and/or I/F of the Web service TOP (201) and the ID of the client of the Web service TOP (201), a message variable that can be used by the Web service TOP (201), a variable that can be used by a call-destination-Web service (the Web service A (210)), and so forth to the Web-service-sequential-processing-descriptive document 501.

At step S511, the public-information-collection unit 203 changes a description 512 into the following processing description, where the description 512 is included in the Web-service-sequential-processing-descriptive document 502 and shows processing performed, so as to convert the self variable into a Web-service-A variable. Namely, the public-information-collection unit 203 changes the description 512 into a description showing processing performed, so as to convert the self variable into a variable of the next Web service for calling.

Next, at step S513, the public-information-collection unit 203 adds a callback-call-processing description 514 provided, so as to call the Web-service TOP (201), before a description 515 about processing performed, so as to transmit a processing-result message to the client. Next, at step S516, the public-information-collection unit 203 transmits the sequential-processing-descriptive document 507 to which the above-described various types of information is added, as an information-added-sequential-processing-descriptive document 517.

In the above-described embodiment, the public-information-collection unit 203 and the sequential-processing-transfer unit 206 are described independently of each other, as two functions. However, when the sequential-processing-transfer unit 206 reads the sequential-processing-descriptive document 501 including no callback information, it may be determined that the Web-service TOP (201) is the first Web service that reads the sequential-processing-descriptive document 501. After making the above-described determination, the sequential-processing-transfer unit 206 may add the callback-call-processing description 514 to the sequential-processing-descriptive document 501 so that final-result information is transmitted to the web-service TOP (201).

FIG. 6 shows the flow of example processing procedures performed by the sequential-processing-transfer unit 206. The details of an information-added-sequential-processing-descriptive document designated by reference numeral 601 are similar to those of the information-added-sequential-processing-descriptive document 517 (the part 507).

At step S602, the sequential-processing-transfer unit 206 reads the information-added-sequential-processing-descriptive document 601 in sequence from the upper part thereof. At step S603, the sequential-processing-transfer unit 206 acquires the entire information about the call-destination-Web service and stores the acquired information into an information-storage area 604. The acquired information includes the information that shows the I/F and/or address of the call-destination-Web service and that is added from the public information 508, at step S506, and the callback information 510 that is added, at step S509. Here, the information-storage area 604 is provided in the RAM 16 and/or the HD 19, for example.

At step S605, the sequential-processing-transfer unit 206 stores the message-variable information 403 in the information-storage area 604. At step S606, the sequential-processing-transfer unit 206 acquires predetermined information, that is, the callback information 510 from the information-storage area 604. The callback information 510 shows the ID of a transmission source of the information-added-sequential-processing-descriptive document 601 (the client), which variable should be used, as the self variable (a variable that can be processed by the Web-service TOP (201)), and so forth.

At step S607, the sequential-processing-transfer unit 206 receives message information transmitted from the client, performs the processing of the Web-service TOP (201), and stores information about a result of the processing in the self variable. At step S608, the sequential-processing-transfer unit 206 converts the self variable into a Web-service-call variable that can be interpreted by the next Web service for calling, and stores the Web-service-call variable in the information-added-sequential-processing-descriptive document 601.

At step S609, the sequential-processing-transfer unit 206 determines whether the details of the next processing description are those of processing performed, so as to call a different Web service, or those of callback-call processing performed for the Web-service TOP (201). If the sequential-processing-transfer unit 206 determines that the details of the next processing description are those of the different-Web-service-call processing (NO in step S609), the processing advances to step S610. If the sequential-processing-transfer unit 206 determines that the details of the next processing description are those of the callback-call processing performed for the Web-service TOP (201) (YES in step S609), the processing advances to step S617. The sequential-processing-transfer unit 206 of the Web-service TOP (201), the sequential-processing-transfer unit 211 of the Web service A (210), and the sequential-processing-transfer unit of each of the Web service B (215) and the Web service C (216) advance from step S609 to step S610. The sequential-processing-transfer unit of the Web service D (217) advances from step S609 to step S617.

At step S610, the sequential-processing-transfer unit 206 adds the following information to the label of the next Web service for calling. That is to say, the sequential-processing-transfer unit 206 adds information about the client (who is the caller), the self variable (a variable that can be handled by the next Web service for calling), and a Web-service-call variable of the next Web service for calling to the label of the next Web service for calling. More specifically, in a part designated by reference numeral 611, the next Web service for calling is the Web-service A (406), and the next processing is performed, so as to convert the Web-service-A variable to the Web-service-B variable (407). Therefore, the sequential-processing-transfer unit 206 can determine that the Web service B is called after the Web service A.

Therefore, the sequential-processing-transfer unit 206 adds information about the Web-service TOP, the Web-service-A variable, and the Web-service-B variable to a label A that is provided for the Web-service A and that is designated by reference numeral 612, as entries. Here, the entry "Web service TOP" indicates that the Web service TOP is a client of the Web service A. Further, the entry "Web-service-A variable" indicates that a variable that can be handled by the Web service A is the Web-service-A variable. Further, the entry "Web-service-B variable" indicates that a variable that can be used by the Web service B which is the next Web service called by the Web service A is the Web-service-B variable. The sequential-processing-transfer unit 206 acquires the above-described information from an information-storage area 504 or the like, and sets the acquired information, as entries of the label A.

At step S613, the sequential-processing-transfer unit 206 deletes a part where a description about processing performed, so as to call the next Web service for calling, is written and the next part where a description about processing performed, so as to convert and store the variable, is written from the information-added-sequential-processing-descriptive document 601. Then, the sequential-processing-transfer unit 206 generates an information-deleted-sequential-processing-descriptive document 615. More specifically, the sequential-processing-transfer unit 206 deletes a Web-service-A-call-processing-description part and a part where a description of processing performed, so as to convert the Web-service-A variable into the Web-service-B variable, is written that are provided in the information-added-sequential-processing-descriptive document 601 and that are designated by reference numeral 611, as indicated by a part designated by reference numeral 614. Then, the sequential-processing-transfer unit 206 generates the information-deleted-sequential-processing-descriptive document 615.

Next, at step S616, the sequential-processing-transfer unit 206 calls the next Web service (the Web service A in the above-described embodiment) by using information including the information-deleted-sequential-processing-descriptive document 615 and the Web-service-call variable that are added to each other, as indicated by an arrow 209 shown in FIG. 2.

On the other hand, at step S617, the sequential-processing-transfer unit 206 acquires information relating to the callback processing from the information-storage area 604. Then, at step S618, the sequential-processing-transfer unit 206 calls a callback function by using the Web-service-call variable (a final-processing result), as indicated by final-processing-result data 222 shown in FIG. 2.

Thus, the sequential-processing-transfer unit 206 reads the sequential-processing-descriptive document, performs the processing, edits the sequential-processing-descriptive document, and transfers the sequential-processing-descriptive document and the processing-result information to the next Web service. Therefore, the Web service that had received message information transmitted from the client can receive the final-processing-result information alone and transmit the final-processing-result information to the client.

Thus, according to the above-described embodiments, the Web services perform the processing in cooperation with one another. Therefore, when the service-supply processing is performed, it becomes possible to prevent processing loads from being concentrated onto a single Web service and/or a single device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-058384 filed Mar. 3, 2006, which is hereby incorporated by reference herein in its entirety.

What is claimed is:

1. A processing apparatus comprising:
 a computer readable memory;
 an input unit configured to input a first process description document; and
 a processing unit configured to store a program in the computer readable memory and execute the program, wherein the processing unit is configured to perform a service in accordance with a procedure written in the first process description document including first, second, third and fourth description parts, the first description part describing a receiving processing for receiving data from a client via a network and a service processing for performing the service, the second description part describing a call processing for calling a second processing apparatus which is connected to the network and provides a second web service, the third description part describing a conversion from a variable used by the second processing apparatus to a variable used by a third processing apparatus, and the fourth description part describing a call processing for calling the third processing apparatus which is connected to the network and provides a third web service, to generate a second process description document including the first and fourth description parts by deleting, from the first process description document, the second and third description parts, and to send the second process description document and result of the service to the second processing apparatus described in the deleted second description part.

2. The processing apparatus according to claim 1, wherein the processing unit adds callback information to the second process description document, where the callback information is used to transmit information about a final result of the procedure to the processing apparatus.

3. The processing apparatus according to claim 1, wherein the first and second process description documents include a description part describing a conversion from at least one variable in which a result of the service is stored into at least one variable used for the processing apparatus to be called next.

4. A processing method performed by a processing apparatus having a processing unit, the processing method comprising:
inputting a first process description document;
performing a service, by the processing unit, in accordance with a procedure written in the first process description document including first, second, third and fourth description parts, the first description part describing a receiving processing for receiving data from a client via a network and a service processing for performing the service, the second description part describing a call processing for calling a second processing apparatus which is connected to the network and provides a second web service, the third description part describing a conversion from a variable used by the second processing apparatus to a variable used by a third processing apparatus, and the fourth description part describing a call processing for calling the third processing apparatus which is connected to the network and provides a third web service;
generating, by the processing unit, a second process description document including the first and fourth description parts by deleting, from the first process description document, second and third description parts; and
sending the second process description document to the next processing apparatus described in the deleted second description part.

5. The processing method according to claim 4, wherein, when the processing is performed, callback information is added to the second process description document, where the callback information is used to transmit information about a final result of the procedure to the processing apparatus.

6. The processing method according to claim 4, wherein the first and second process description documents include a description part describing a conversion from at least one variable in which a result of the service is stored into at least one variable used for the processing apparatus to be called.

7. A computer readable medium containing computer-executable instructions for a processing, the computer readable medium comprising:

computer-executable instructions for inputting a first process description document;
computer-executable instructions for performing a service in accordance with a procedure written in the first process description document including first, second, third and fourth description parts, the first description part describing a receiving processing for receiving data from a client via a network and a service processing for performing the service, the second description part describing a call processing for calling a second processing apparatus which is connected to the network and provides a second web service, the third description part describing a conversion from a variable used by the second processing apparatus to a variable used by a third processing apparatus, and the fourth description part describing a call processing for calling the third processing apparatus which is connected to the network and provides a third web service;
computer-executable instructions for generating a second process description document including the first and fourth description parts by deleting, from the first process description document, second and third description parts; and
sending the second process description document to the next processing apparatus described in the deleted second description part.

8. The computer readable medium according to claim 7, wherein, when the processing is performed, callback information is added to the second process description document, where the callback information is used to transmit information about a final result of the procedure to the computer.

9. The computer readable medium according to claim 7, wherein the first and second process description documents include a description part describing a conversation from at least one variable in which a result of the service is stored into at least one variable used for the processing apparatus to be called next.

10. The processing apparatus according to claim 1, wherein the first and second process description documents are sequential process description documents.

11. The processing apparatus according to claim 1, wherein the first and second process description documents are WSBPEL documents.

12. The processing method according to claim 4, wherein the first and second process description documents are sequential process description documents.

13. The processing method according to claim 4, wherein the first and second process description documents are WSBPEL documents.

14. The processing computer readable medium according to claim 7, wherein the first and second process description documents are sequential process description documents.

15. The processing computer readable medium according to claim 7, wherein the first and second process description documents are WSBPEL documents.

* * * * *